United States Patent
Wang

[19]

[11] Patent Number: 6,041,672

[45] Date of Patent: Mar. 28, 2000

[54] RECIRCULATION BALL-SCREW DEVICE

[76] Inventor: Mu Tan Wang, No. 6, Alley 3, Lane 191, Chung Cheng North Rd., San Chorng City, Taipei Hsien, Taiwan

[21] Appl. No.: 09/092,032

[22] Filed: Jun. 5, 1998

[51] Int. Cl.[7] ................................................. F16H 55/17
[52] U.S. Cl. ....................... 74/459; 74/89.15; 74/424.8 R
[58] Field of Search .................... 74/89.15, 459, 74/424.8 R

[56] References Cited

U.S. PATENT DOCUMENTS

| | | | |
|---|---|---|---|
| 4,211,125 | 7/1980 | Benton | 74/424.8 R |
| 5,014,568 | 5/1991 | Schlenker | 74/424.8 R |
| 5,373,755 | 12/1994 | Rohlinger | 74/459 |
| 5,711,188 | 1/1998 | Miyaguchi et al. | 74/459 |

*Primary Examiner*—David M. Fenstermacher
*Attorney, Agent, or Firm*—Rosenberg, Klein & Lee

[57] ABSTRACT

A ball-screw device is provided that includes a bearing seat with an internal thread for receiving a screw rod with a plurality of balls therebetween. A guiding groove is formed on an outer surface of the bearing seat, and a screw hole is formed at each of the opposing ends of the guiding groove. Balls from within the bearing seat will pass through one through hole, travel along the guiding groove and return to the interior of the bearing seat through the other through hole, when the screw rod is rotated. By that arrangement, vibration of the bearing seat is avoided.

1 Claim, 5 Drawing Sheets

RECIRCULATION BALL-SCREW DEVICE

BACKGROUND OF THE INVENTION

Prior Art

The ball bearing is now widely used in mechanics, and used to provide a steady and fast operation. The ball bearing combined with a screw rod has a preferred effect. In the prior art, the screw is combined with a cover seat. Since the rotation of the screw rod is purely along the thread, the rotary speed cannot gain a preferred convenience. This is because the thread is very active in movement of the screw rod, especially, as the screw rod and the cover se at have become rusty.

As a consequence, a ball bearing arrangement was invented. Referring to FIG. 1, the ball bearing seat (A) covers a screw rod (B). The balls will roll within the ball bearing seat (A), thus the screw rod can be operated quickly. This kind of structure is widely employed today. However, it has been known that there are some defects in using that type of ball bearing. That is, in order that the balls (C) may roll within the ball bearing seat (A), a guiding tube (A1) is installed outside the bearing seat, so that the balls (C) may roll cyclically within the ball bearing seat (A) and through the guiding tube (A1). But, since the guiding tube (A1) is installed outside the bearing seat, in operation, the ball bearing seat (A) will vibrate eccentrically. Thus in design, the ball bearing seat (A) is eccentric with respect to the installation of the guiding tube, so that the bearing seat will not rotate with equilibrium. In installing the guiding tube (A1), the guiding tube covers on one side of the ball bearing seat (A), thus during installation, it is difficult to assemble with the balls (C) and a fixing piece (A2) that is used to fix the guiding tube (A1). Therefore, the possibility of loosening of the fixing screws increases. Further, since the weights of the parts are not identical, the structure will not be steady.

SUMMARY OF THE INVENTION

Accordingly, the object of the present invention is to provide a recirculation ball-screw device with a guiding groove formed in the bearing seat, the two ends of the guiding groove having through holes formed therein so that the balls will move within the bearing seat. The balls are rotated cyclically within the bearing seat through the guiding of the guiding groove. As a consequence, the vibration of the bearing seat will be avoided, and the operation of the ball bearing and the screw rod are more steady.

A further object of the present invention is to provide a recirculation ball-screw device, wherein the guiding groove and the bearing seat are formed integrally, thus the difficulty in eccentric positioning of a guiding tube is avoided, and the parts thereof are easily manufactured.

The present invention will be better understood and its numerous objects and advantages will become apparent to those skilled in the art by referencing the following drawings.

DESCRIPTION OF THE PREFERRED EMBODIMENT

Figure 1:
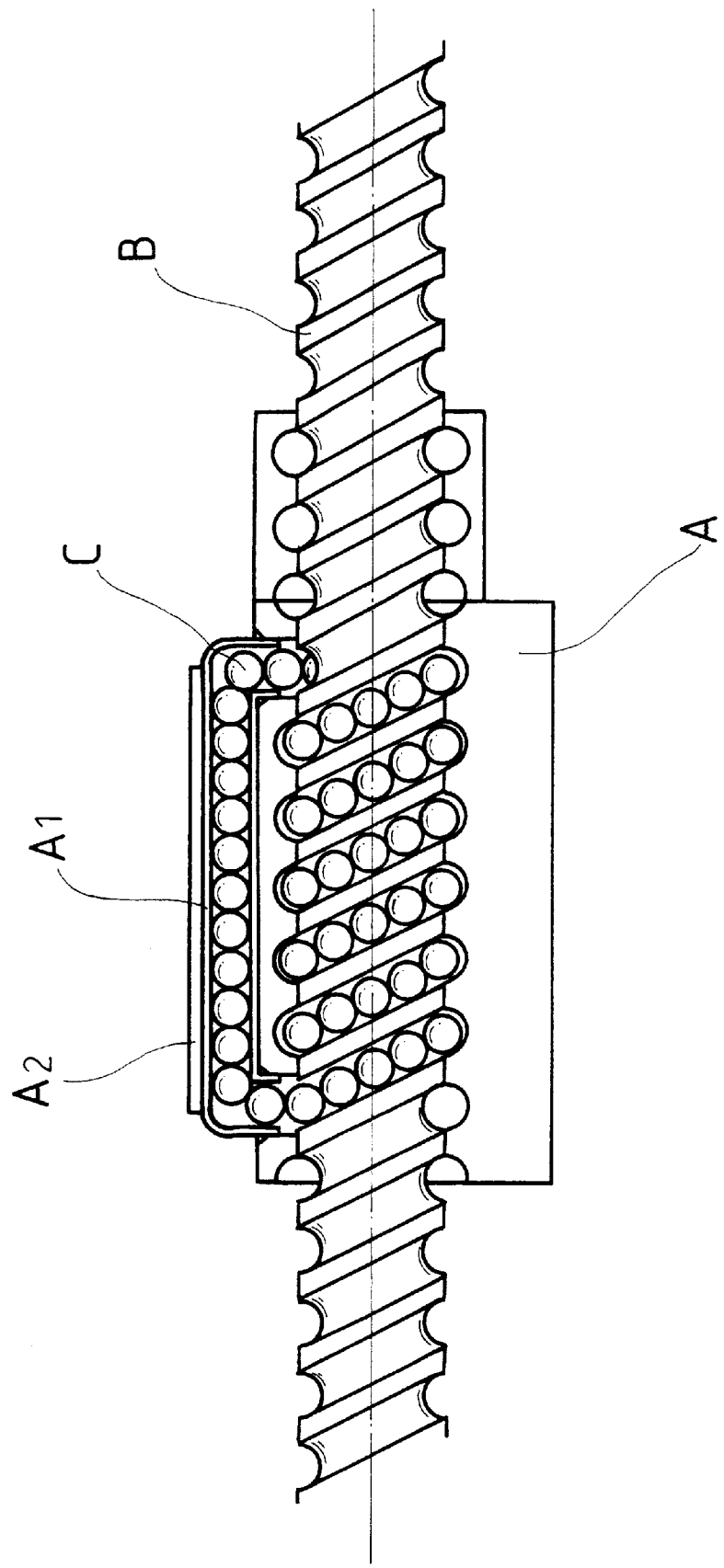
FIG. 1 is a cross-sectional view of the recirculation ball-screw device of the present invention.
Figure 2:
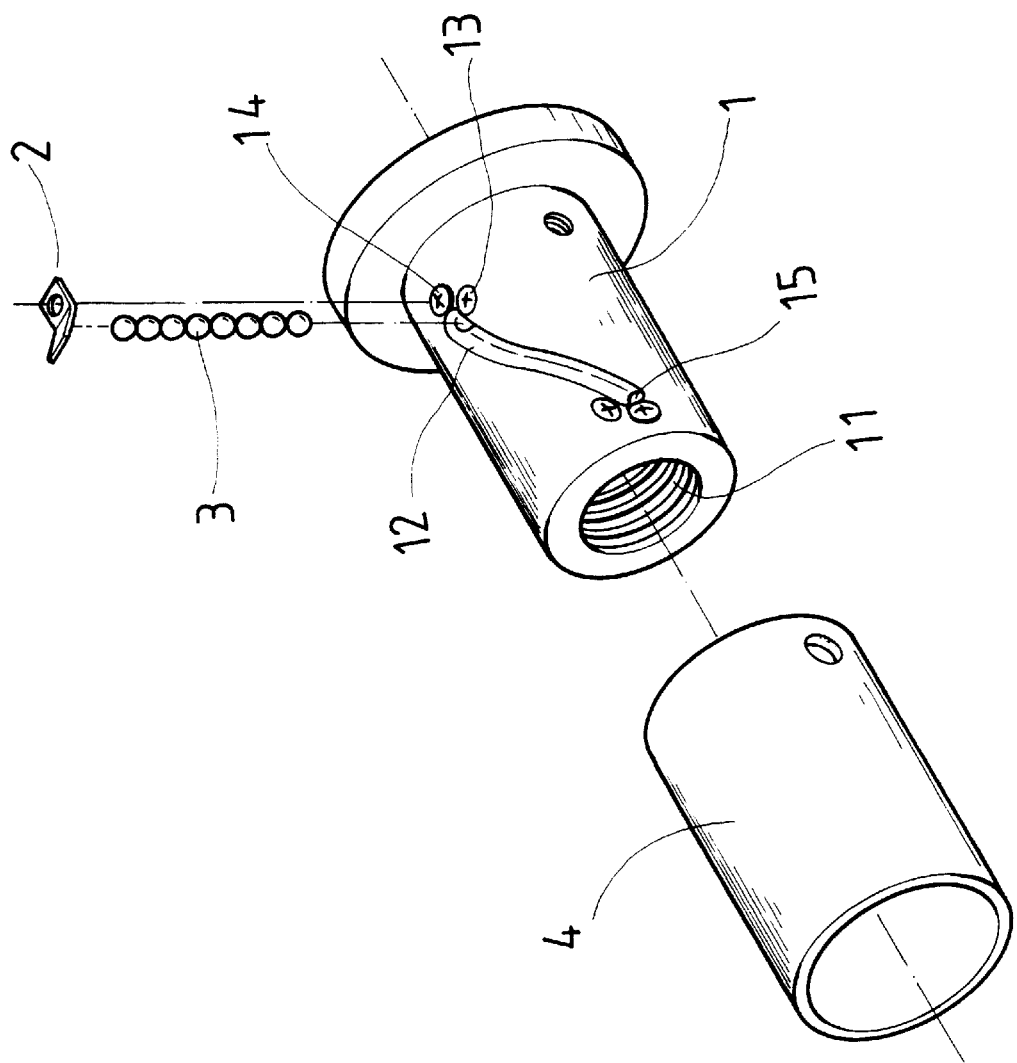
FIG. 2 is a perspective view of the present invention.

The recirculation ball-screw device of the present invention comprises a bearing seat 1, a guiding piece 2, balls 3 and a sleeve 4, as shown in FIG. 2.

The bearing seat 1 is a hollow cylinder within which an inner thread 11 is formed for being screwed together with a screw rod 5, and a guiding groove 12 is formed on an outer surface of the bearing seat 1. The two ends of the guiding groove 12 have through holes 11 formed through the wall of the bearing seat 1. The guiding groove 12 has a curved shape and stopping screws 13 are installed outside the through holes 15. The two stopping screws 13 are each located on the outer periphery of the guiding groove 12. The head and end portions of the guiding groove are spaced a predetermined distance with respect to the inner thread 11, while a fixed screw 14 is installed outside the guiding groove 12 and the through hole 15.

The guiding piece 2 is a piece with an inclined front end disposed over the through hole 15 and the opposing end secured by the fixed screw 14.

Figure 3:
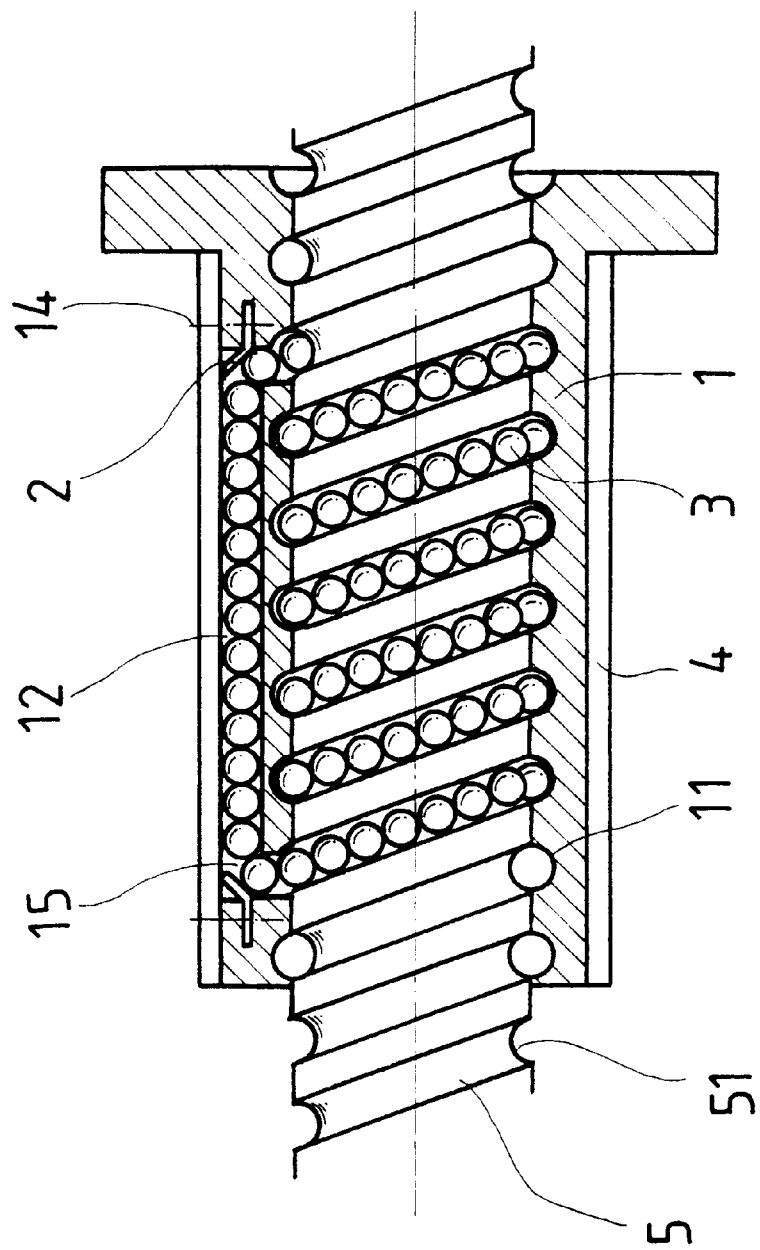
FIG. 3 is an assembled cross-sectional view of the present invention.
Figure 4:
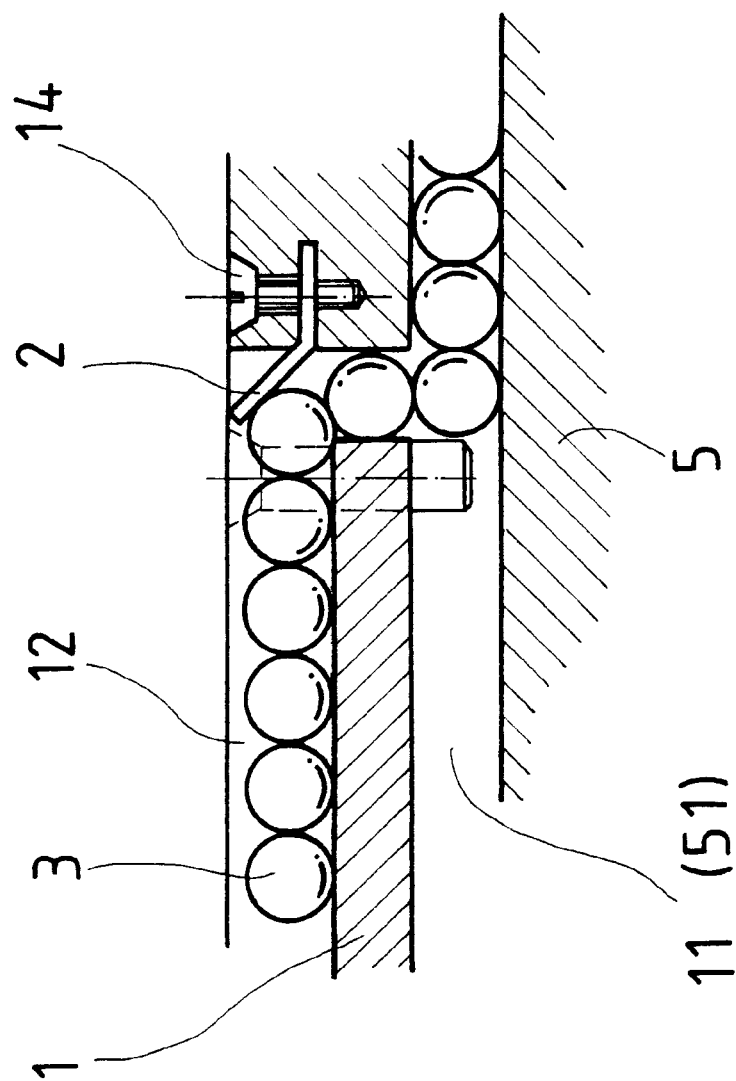
FIG. 4 shows the condition with the balls located within the guiding groove.
Figure 5:
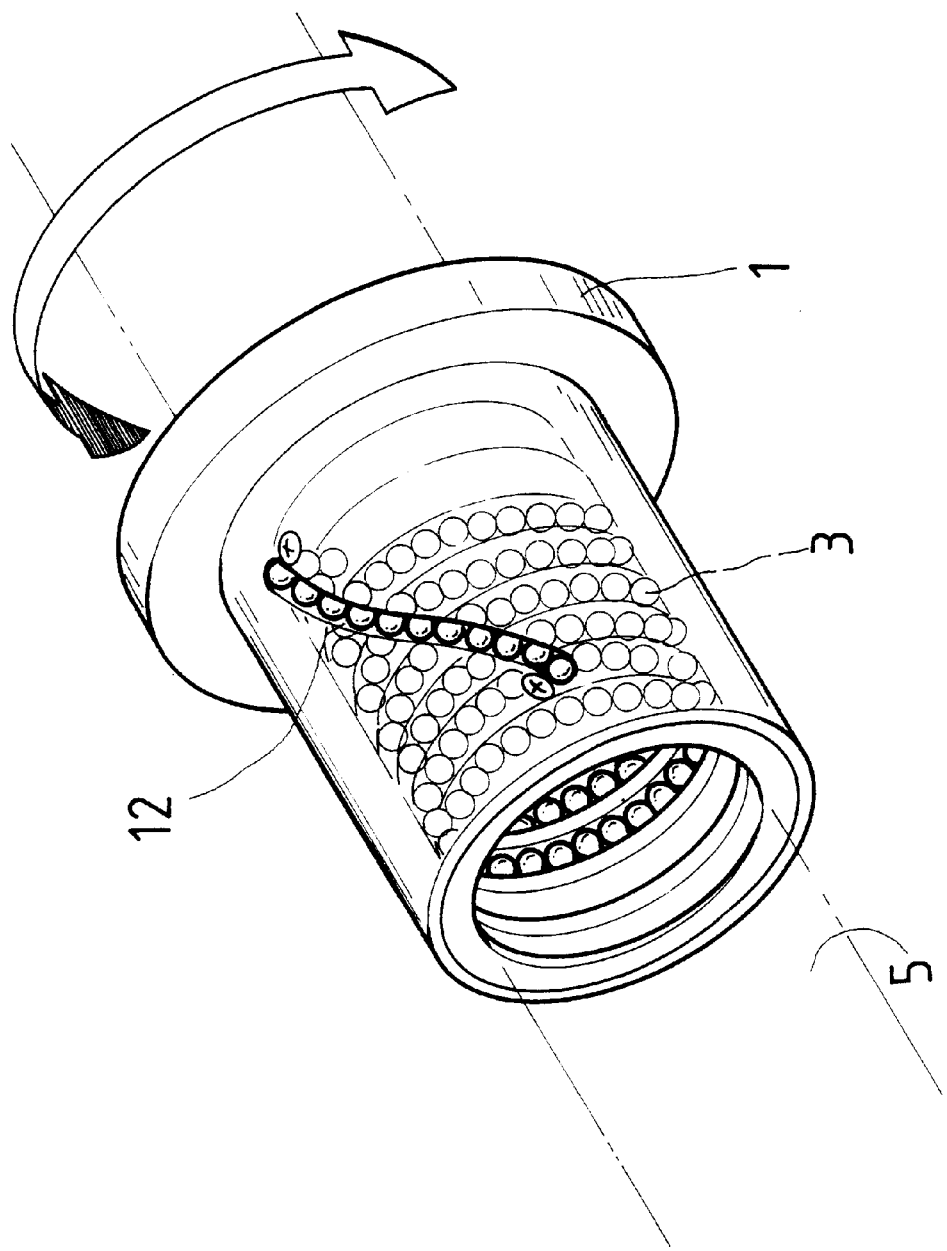
FIG. 5 shows the operational condition of the present invention.

Most of the balls 3 are located within the guiding groove 12 and the inner thread 11, the number received is related to the number of revolutions of the inner thread 11 between the two through holes 15. In assembling these components, of course a screw rod 5 is included. At first, the stopping screws 13 are fixed, then the fixed screws 14 are penetrated through the guiding piece 2 to be fixed outside the through holes 15 so that the inclined portion of the guiding pieces 2 are above the respective through holes 15. After being fixed, the screw rod 5 is inserted into the bearing seat 1, and as the outer thread 51 of this screw rod 5 is engaged with the inner thread 11 of the bearing seat 1, a receiving space is formed for receiving the balls 3, as disclosed in FIG. 3. After the balls 3 are inserted thereinto from the through holes 15, then the sleeve 4 covers the bearing seat 1.

In operation, the bearing seat 1 is rotated. The plurality of balls 5 roll along the inner thread 11, outer thread 51 and along the guiding groove 12 to recirculate back to the threads. As the bearing seat 1 is rotated, the balls 3 will be stopped by the stopping screws 13 and then enter into the guiding groove 12 from the upper through hole 15, and move to the lower through hole 15. The balls 3 will move in an opposite direction, when the bearing seat is rotated in an opposite direction, and then the balls 3 are stopped by the stop screws 13 on the lower end. Next, the balls 3 enter the guiding groove 12 through the through hole 15 and move to the upper through hole 15. Therefore, by the rolling of the balls 3, the bearing seat 1 will be raised or descended easily. When the balls 3 enter the guiding groove 12 from the through hole 15, since the through hole 15 is orthogonal to the guiding groove 12, a respective conducting piece 2 with an inclined front end is installed over the through holes 15 of the present invention. By the inclined portion of this conducting piece 2, the ball 3 may directly enter the guiding groove 12 from a respective through hole 15 and is then guided to the other through hole 15. The action is very quick and is not hindered.

It is appreciated that stopping screws 13 are respectively installed outside of the through holes 15 so that the ball 3 will not roll beyond the preset range.

Accordingly, as described hereinabove, in the present invention, by use o f a guiding groove formed in the bearing set, not only is the vibration problem of the prior bearing seat solved, but also the present invention may be assembled quickly and easily. In manufacturing a sub-eccentric structure can be avoided.

The various embodiments described above are provided by way of illustration only and should not be constructed to limit the invention. Those skilled in the art will readily recognize various modifications and changes which may be made to the present invention without strictly following the exemplary embodiment and application illustrated and described herein, and without departing from the true spirit and scope of the present invention which is set forth in the following claims.

What is claimed is:

1. A recirculation ball-screw device, comprising:

a screw rod having an external thread formed thereon;

a longitudinally extended bearing seat having a substantially cylindrical wall and a threaded bore extending between opposing longitudinal ends thereof for threadedly receiving said screw rod therein, said external thread of said screw rod being engaged with threads of said threaded bore and having a receiving space therebetween, said bearing seat having an arcuate guiding groove formed in an outer surface of said wall and a pair of through holes respectively formed in said wall in open communication with said threaded bore at opposing longitudinally spaced ends of said guiding groove;

a plurality of balls disposed in said receiving space to form bearing surfaces between said screw rod and said bearing seat and disposed in said guiding groove;

a pair of stopping screws respectively affixed through said wall adjacent said pair of through holes for limiting displacement of said plurality of balls within said receiving space during rotation of said screw rod and redirecting said balls through a respective one of said through holes into said guiding groove in correspondence with a direction of said screw rod's rotation;

a pair of guiding members secured to said bearing seat, each of said guiding members having an inclined end portion positioned over a respective one of said through holes for guiding said balls into said guiding groove; and, a tubular sleeve having a through bore for receiving said bearing seat therein and thereby forming a cover for said guiding groove, wherein balls displaced from said receiving space through one of said through holes as said screw rod is rotated are displaced through said guiding groove and returned to said receiving space through said other of said through holes.

* * * * *